US011600164B2

(12) United States Patent
Morrison

(10) Patent No.: US 11,600,164 B2
(45) Date of Patent: Mar. 7, 2023

(54) SYSTEM TO WARN A DRIVER ABOUT THE PRESENCE OF A CHILD IN A VEHICLE

(71) Applicant: Samuel Morrison, Le Mars, IA (US)

(72) Inventor: Samuel Morrison, Le Mars, IA (US)

( * ) Notice: Subject to any disclaimer, the term of this patent is extended or adjusted under 35 U.S.C. 154(b) by 251 days.

(21) Appl. No.: 17/105,895

(22) Filed: Nov. 27, 2020

(65) Prior Publication Data
US 2021/0082272 A1  Mar. 18, 2021

Related U.S. Application Data

(60) Provisional application No. 62/941,280, filed on Nov. 27, 2019.

(51) Int. Cl.
| | |
|---|---|
| *G08B 21/00* | (2006.01) |
| *G08B 21/24* | (2006.01) |
| *B60N 2/00* | (2006.01) |
| *B60R 16/03* | (2006.01) |
| *B60N 2/26* | (2006.01) |
| *B60N 2/90* | (2018.01) |

(52) U.S. Cl.
CPC ............ *G08B 21/24* (2013.01); *B60N 2/002* (2013.01); *B60N 2/26* (2013.01); *B60R 16/03* (2013.01); *B60N 2002/981* (2018.02)

(58) Field of Classification Search
CPC ........ G08B 21/24; G08B 21/22; B60N 2/002; B60N 2/26; B60N 2002/981; B60R 16/03

USPC ......................................................... 340/457
See application file for complete search history.

(56) References Cited

U.S. PATENT DOCUMENTS

| | | | | |
|---|---|---|---|---|
| 2007/0052529 | A1* | 3/2007 | Perez ................. | B60N 2/002 340/457 |
| 2007/0268119 | A1* | 11/2007 | Cram ................. | B60Q 9/00 340/457 |
| 2014/0361889 | A1* | 12/2014 | Wall, II ............. | G08B 21/025 340/539.11 |
| 2016/0049061 | A1* | 2/2016 | Scarborough ..... | G08B 21/24 340/449 |
| 2018/0315292 | A1* | 11/2018 | Pham ................. | B60Q 9/00 |
| 2019/0248286 | A1* | 8/2019 | Maxwell ............ | B60Q 9/00 |

* cited by examiner

*Primary Examiner* — Mark S Rushing
(74) *Attorney, Agent, or Firm* — Barry Choobin; Patent 360

(57) ABSTRACT

Disclosed is a child safety system for a vehicle that can alert a driver of the vehicle about the presence of a child in the vehicle when the door of the vehicle is opened. The disclosed child safety system includes a plurality of weight sensor pads that can connect with different seats of the vehicle. The plurality of sensor pads can connect to a central unit through a splitter. The central unit includes an audio alarm, a light source, and a battery. The disclosed system further includes a magnetic door switch that can be installed on the driver's side door for detecting the opening of the door. The magnetic door switch can also be electrically connected to the central unit.

18 Claims, 3 Drawing Sheets

SYSTEM TO WARN A DRIVER ABOUT THE PRESENCE OF A CHILD IN A VEHICLE

CROSS-REFERENCE TO RELATED APPLICATIONS

This application claims priority to the U.S. provisional patent application Ser. No. 62/941,280, filed on Nov. 27, 2019 which is incorporated herein by reference in its entirety.

FIELD OF INVENTION

The present invention relates to a child seat safety system for vehicles, and more particularly, the present invention relates to a system that can detect and alert the driver of the presence of one or more children in the vehicle.

BACKGROUND OF THE INVENTION

It is not uncommon that infants or children are left in the back seat of an unattended vehicle. Although unintentional, a driver, while leaving the vehicle, may forget that a child is in the back seat. On reason can be that the driver is in a pre-occupied mind set and forgets the presence of a child in the back seat. It can also be due to the negligence of the driver. Whatever could be the reasons, but such incidents of a child left in an unattended vehicle are on the rise. Children left in an unattended vehicle may suffer from heat stroke resulting in serious injury or even death. According to an estimate, in 2019, around 50 children under the age of 15 died in the unattended vehicles due to heat stroke.

Child safety systems are known in the art that can detect and warn the driver that a child is left behind in the car. However, the known child safety systems for a vehicle are designed for a single infant or child. Users having more than one child must buy multiple safety systems. Buying multiple child safety systems can increase the cost dramatically. Moreover, the installation and functioning of the multiple child safety systems can become complex.

Thus, a need is appreciated for a child seat alarm system that can detect and alert the driver of a vehicle about the presence of one or more children in an automobile, when the driver leaves the vehicle. The need is for a system that can be installed in multiple car seats or infant seats in the vehicle.

The term "vehicle" herein connotes an automobile having an enclosed sitting area, wherein accesses to the enclosed area can be provided with doors and windows. The vehicle includes cars, trucks, and like.

SUMMARY OF THE INVENTION

The principal object of the present invention is therefore directed to a car safety seat alarm system that can be installed in multiple seats of a vehicle.

It is another object of the present invention that the car safety seat alarm system can provide safety for one or more children in a vehicle.

It is still another object of the present invention that the car safety seat alarm system can be used with many different types of car seat setup.

It is yet another object of the present invention that the car safety seat alarm system is quick and easy to install.

In one aspect, disclosed is a car safety seat alarm system that includes a plurality of weight sensor pads that can be installed in a car seat, a child seat, or an infant seat of a vehicle. The different seats of the vehicle, including a car seat, a child seat, or an infant seat are referred to hereinafter as a "seat". Each of the plurality of weight sensor pads can detect the presence or absence of a child on a seat by sensing the weight applied on the seat. The disclosed system triggers an alarm and lighting source in the vehicle when the door of the vehicle is open, and one or more children are present on the seat.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
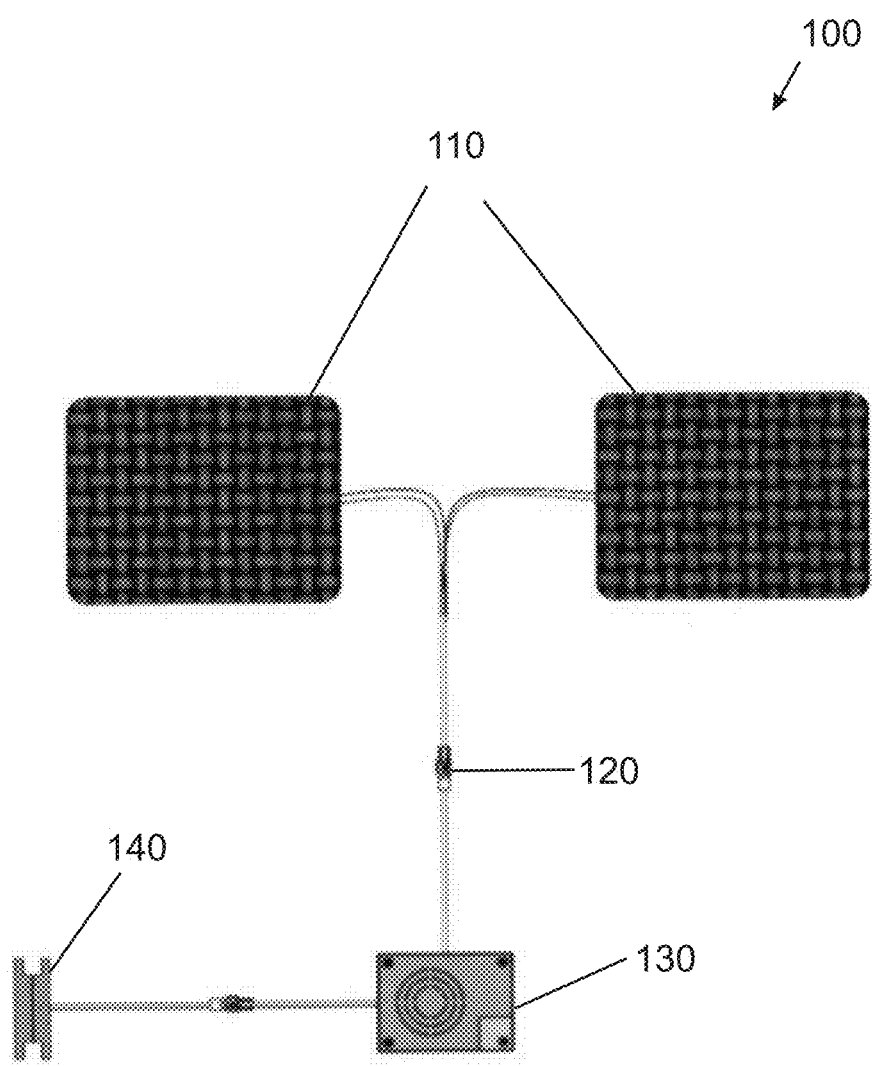
FIG. 1 illustrates an exemplary embodiment of the car safety seat alarm system, according to the present invention.

Disclosed is a car safety seat alarm system that helps take the worry out of a child being left behind in a vehicle. The disclosed system is quick and easy to install and can be used with many different types of car seat setups and has a number of options to fit different vehicle sizes and styles. Not only does this car seat alarm allow for use with different car seats and styles, but it allows for two car seats to be secured using one alarm system. Referring to FIG. 1 shows an exemplary embodiment of the car safety seat alarm system 100. The disclosed car safety seat alarm system includes multiple weight sensor pads. The system 100 shown in FIG. 1 is having two weight sensor pads 110. The weight sensor pads can be installed on the seating area of a seat. The two weight sensor pads can be installed in two different seats of the vehicle. The disclosed assembly can accommodate two or more different car seat set ups using one alarm and magnetic switch. This is convenient for parents and caretakers that have more than one child. Disclosed assembly can be used with an infant carrier, rear or front facing car seat, booster seat or a combination of any of the above. Each weight sensor pads sense weight applied to it. So, the weight sensor pads can detect the presence and absence of an infant or child by sensing the weight of the infant or child on the seat. Each weight sensor pad can be calibrated according to the average weight of an infant to prevent false alarms.

Figure 2:
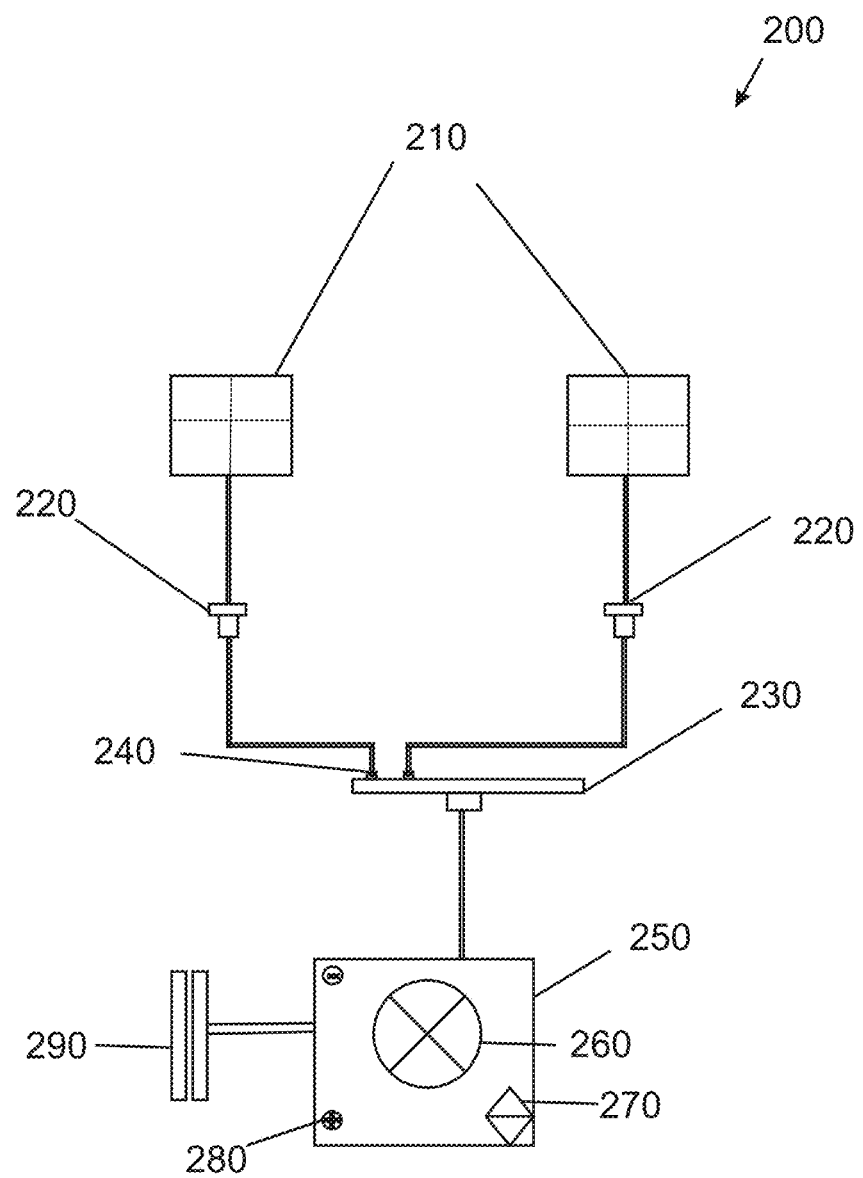
FIG. 2 illustrates another view of the car safety seat alarm system of FIG. 1.

The weight sensor pads can be held in place by using hook and loop fasteners or double-sided tape. This allows the sensor pads to be removed easily for cleaning or to shift the sensor pads to another vehicle. For example, if a sensor pad is installed on a car seat, it can be easily moved to another vehicle by disconnecting the pad from the main unit and then reconnecting it in a different vehicle. For convenience, with an infant carrier, the sensor pad is placed into the base of the car seat that is seat belted to the vehicle. This allows the infant carrier to be removed without having to connect or disconnect the sensor pad. When the carrier is placed back onto the base and locked in, the weight activates the sensor pad. The sensor pads can be made waterproof to protect from any liquid spills. The two-weight sensor pads are shown in FIGS. 1 and 2 branches from a splitter 120. The splitter can connect multiple weight sensors to a single alarm unit. Each sensor pad can independently trigger the alarm of the disclosed system. The splitter can be provided with ports to connect multiple sensor pads. Each weight sensor pad can be plugged into the port of the splitter wherein the ports allow the sensor pads to be unplugged and replaced.

Figure 3:
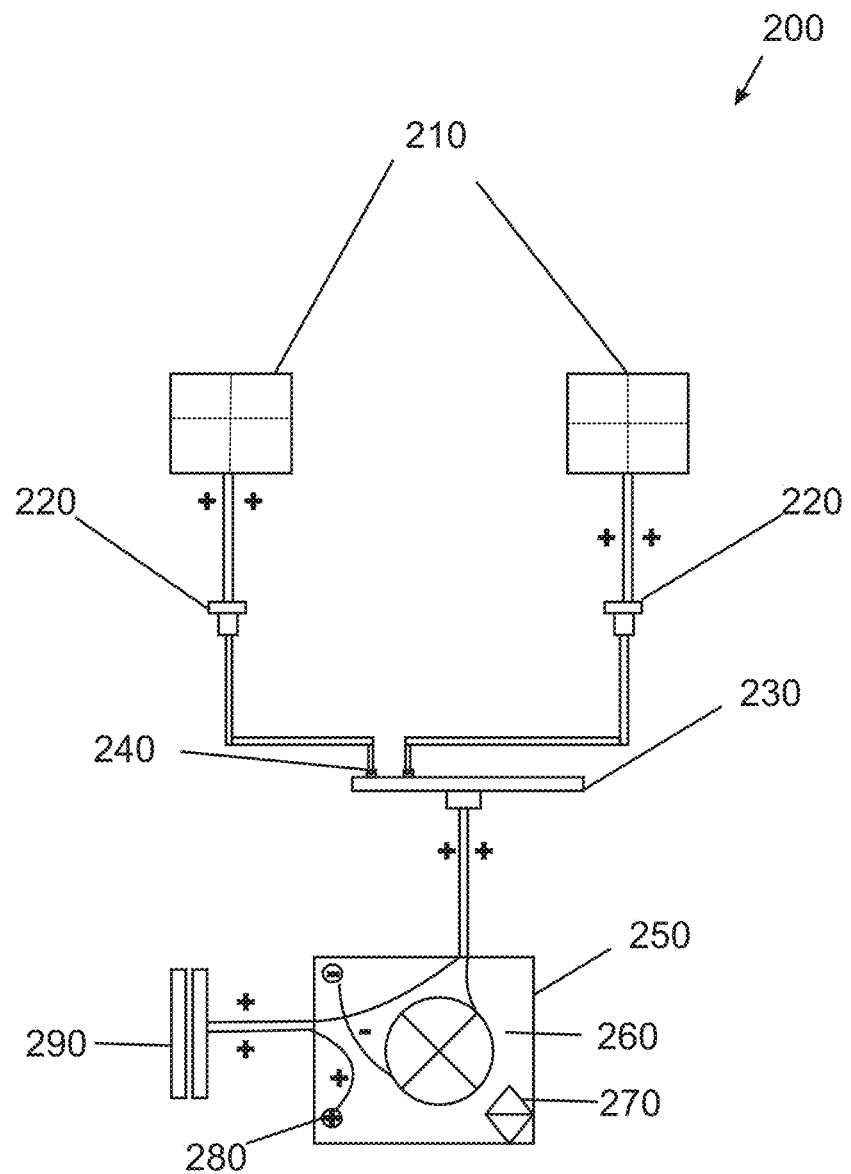
FIG. 3 illustrate current flow in the car safety seat alarm system of FIG. 2.

The splitter 120 can connect with the central unit 130 through wires. The central unit can include housing that can attach to the vehicle anywhere near the driver seat. The housing can attach with a hook and loop fastener, double side adhesive tape, or like mechanisms known in the art. The housing can enclose an alarm, a light source, and a battery. The alarm can produce a loud sound in the form of an audio alert or a beep to alert the driver. Similarly, the light source can produce a visible light either continuous or blinks to alert the driver. The light can be white, red, blue, or of any color. FIGS. 1 and 2 also show a magnetic switch 140 that connects to the central unit 130 through a wire. The magnetic switch can be installed along the driver's side door and can be switched between an open state and a close state based on the opening and closing of the door. The sensor pads, alarm unit, light source, and the magnetic door switch can be powered by the battery enclosed in the housing, thus making the disclosed system portable. The components including the sensor pads, alarm unit, light source, and the magnetic door switch can be wired. The disclosed system can be separate from the electrical wiring of the vehicle, and thus is a stand-alone wired system that can be easily installed, removed, and replaced. It uses a single wired circuit with two contact points to complete the circuit from a single power source (FIG. 3). Alternatively, the disclosed system can also be powered by a vehicle electrical system, wherein the disclosed system allows a user to switch between the vehicle's electrical system and inbuilt battery. Thus, the user has a choice to switch between the vehicle's power supply and the inbuilt power supply of the vehicle.

When weight is applied on the weight sensor pads, the disclosed system gets activated, i.e. presence of a child on at least one seat with a weight sensor pad activates the disclosed system. The magnetic door switch can detect the status of the door i.e. if the door is open or closed. The magnetic door switch on detecting the opening of the door can either complete a circuit or break a circuit. In one case, when at least one child is present on the weight sensor pad, current can flow in a circuit connecting the magnetic door switch and the alarm unit. Opening the door breaks the circuit resulting in triggering of the alarm and the light source. Alternatively, when at least one child is present on the weight sensor pad activating the disclosed system, the current cannot flow in a circuit connecting the magnetic door switch and the alarm unit. The opening of the door results in the closing of the circuit triggering the alarm and the light source. Thus, the disclosed system automatically gets activated when a child is present on a seat and when the door at the driver's side is open, the disclosed system can trigger an alert to remind the driver about the presence of the child.

FIG. 2 shows an embodiment of the disclosed system 200 having two weight sensor pads 210 connected to a splitter 230 through plug brackets 220. The splitter having ports 240 for connecting the weight sensor pads. The splitter 230 connects to the central unit 250. The central unit having the speaker 260, a light source 270 and a battery 280. A magnetic door switch 290 also connected with the central unit 250. Referring to FIG. 3, the weight pad sensors 210, magnetic door switch 290, and alarm 260 form a circuit. A wire runs from the central unit to the car seat and from the car seat to the magnetic door switch. When weight is applied to the sensor pad, power begins to connect at the sensor pad and to the magnetic door switch. The power holds the magnetic door switch in an open position. When the driver side door is opened, the magnetic door switch closes completing the circuit and activating the alarm and light.

It is to be understood that the disclosed assembly has been described for protecting children, the disclosed assembly can also be used to remind the driver to look in the back seat for important things, such as valuables, pets, or other items that could be forgotten. Additionally, the light source and the speaker are shown enclosed in a central unit, the light source can also be separated from the alarm box to allow for a visual notification to the driver. For example, if the alarm box is placed under the dashboard, the light source could be placed on the dashboard to flash when the system is activated. The light source can emit irradiation of any contrasting color, such as red. The light source be a strobe light or just blinks. The present invention is advantageous that the sensor pads can easily be detached from the central unit disconnecting the locking brackets or latches. This allows the assembly to be easily installed and removed to another vehicle or for cleaning. The disclosed assembly can also be equipped with a test button that allows the user to check and test the life of the battery to ensure the system has enough power to function properly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A child safety system for a vehicle for alerting a driver about the presence of a child in the vehicle when the door of the vehicle is opened, the system comprises:
   a plurality of weight sensor pads each configured to be removably installed in a different seat of a vehicle;
   a splitter electrically connecting the plurality of weight sensors with a central unit, the central unit comprises:
     a speaker for audio alert,
     a light source for visual alert, and
     a battery; and
     a magnetic door switch configured to detect an open state and a close state of a driver's side door of the vehicle, the magnetic door switch electrically coupled to the central unit,
     wherein each of the plurality of weight sensor pads configured to independently activate the magnetic door switch upon detection of a child on a seat.

2. The system according to claim 1, wherein each of the plurality of weight sensor pads comprises a hook and loop fastener for removably coupling each weight sensor pad to the seat of the vehicle.

3. The system according to claim 1, wherein the light source is a strobe light coupled to a dashboard of the vehicle and the central unit enclosing the speaker is installed under seat of the vehicle.

4. The system according to claim 1, wherein the splitter comprises a plurality of ports for removably connecting each of the plurality of weight sensor pads.

5. The system according to claim 1, wherein at least two weight sensor pads are coupled to at least two seats, wherein at least one seat of the at least two seats is an infant seat.

6. The system according to claim 1, wherein the magnetic door switch configured to detect opening of the door and complete a circuit resulting in flow of current to the central unit resulting in triggering of the audio alert and the visual alert.

7. The system according to claim 1, wherein the magnetic door switch configured to detect opening of the door and break a circuit hindering flow of current to the central unit resulting in triggering of the audio alert and the visual alert.

8. The system according to claim 1, wherein the speaker, the light source, the plurality of weight sensor pads, and the magnetic door switch are powered by the battery, the central unit further comprises a circuitry to detect the battery health.

9. The system according to claim 8, wherein the central unit further comprises a switch to select between a vehicle's electrical system and the battery for powering the speaker, the light source, the plurality of weight sensor pads, and the magnetic door switch.

10. A vehicle comprising:
    a plurality of weight sensor pads coupled to a plurality of seats of the vehicle;
    a splitter electrically connecting the plurality of weight sensors with a central unit, the central unit comprises:
      a speaker for audio alert,
      a light source for visual alert, and
      a battery; and
      a magnetic door switch coupled to a driver's side door of the vehicle and configured to detect opening of the door, the magnetic door switch electrically coupled to the central unit,
      wherein each of the plurality of weight sensor pads configured to independently activate the magnetic door switch upon detection of a child on a seat.

11. The vehicle according to claim 10, wherein the plurality of weight sensor pads comprises a hook and loop fastener for removably coupling to the plurality of seats of the vehicle, wherein at least one seat of the plurality of seats is an infant seat.

12. The vehicle according to claim 11, wherein the plurality of weight sensor pads is waterproofed.

13. The vehicle according to claim 12, wherein the splitter comprises a plurality of ports that removably connect the plurality of weight sensor pads.

14. The vehicle according to claim 13, wherein at least two weight sensor pads are coupled to at least two seats.

15. The vehicle according to claim 10, wherein the magnetic door switch, upon detecting the opening of the door, complete a circuit resulting in flow of current to the central unit resulting in triggering of the audio alert and the visual alert.

16. The vehicle according to claim 10, wherein the magnetic door switch, upon detecting the opening of the door, break a circuit hindering flow of current to the central unit resulting in triggering of the audio alert and the visual alert.

17. The vehicle according to claim 10, wherein the speaker, the light source, the plurality of weight sensor pads, and the magnetic door switch are powered by the battery, the central unit further comprises a circuitry to detect the battery health.

18. The vehicle according to claim 17, wherein the central unit further comprises a switch to select between the vehicle's electrical system and the battery for powering the speaker, the light source, the plurality of weight sensor pads, and the magnetic door switch.

* * * * *